US008113359B2

(12) United States Patent
Perryman

(10) Patent No.: US 8,113,359 B2
(45) Date of Patent: Feb. 14, 2012

(54) SEDIMENT COLLECTION DEVICE FOR HOME BREWING SYSTEM

(76) Inventor: Trevor Perryman, Newtown (AU)

(*) Notice: Subject to any disclaimer, the term of this patent is extended or adjusted under 35 U.S.C. 154(b) by 755 days.

(21) Appl. No.: 12/229,267

(22) Filed: Aug. 21, 2008

(65) Prior Publication Data

US 2009/0173674 A1 Jul. 9, 2009

Related U.S. Application Data

(60) Provisional application No. 60/965,982, filed on Aug. 23, 2007.

(51) Int. Cl.
*B01D 35/02* (2006.01)
*B01D 21/00* (2006.01)
*B65D 39/08* (2006.01)

(52) U.S. Cl. ........ 210/464; 210/514; 210/518; 210/533; 215/355; 215/360; 215/358

(58) Field of Classification Search .................. None
See application file for complete search history.

(56) References Cited

U.S. PATENT DOCUMENTS

| 1,908,975 | A |   | 5/1933  | Grauman et al. |            |
|-----------|---|---|---------|----------------|------------|
| 2,779,472 | A |   | 1/1957  | Febbraro       | 210/57     |
| 3,122,285 | A | * | 2/1964  | Pluess         | 222/464.5  |
| 3,856,169 | A | * | 12/1974 | Wilson et al.  | 215/6      |
| 3,946,780 | A |   | 3/1976  | Sellers        | 150/8      |
| 4,059,250 | A |   | 11/1977 | Guldener et al.| 251/304    |
| 4,222,504 | A |   | 9/1980  | Ackerman       | 222/569    |
| 4,687,115 | A | * | 8/1987  | Bongiovanni    | 215/355    |
| 4,823,969 | A |   | 4/1989  | Caldwell       | 215/260    |
| 5,417,860 | A |   | 5/1995  | Kay            | 210/477    |
| 6,515,242 | B2|   | 4/1997  | Mandola        | 210/238    |
| 5,829,644 | A |   | 11/1998 | Brightwell et al.| 222/189.07 |
| 5,914,045 | A |   | 6/1999  | Palmer et al.  | 210/694    |
| 2003/0091701 | A1 |   | 5/2003 | Yahav        |            |
| 2011/0030810 | A1 | * | 2/2011 | Shellcot et al. | 137/171 |

FOREIGN PATENT DOCUMENTS

GB 2 219 301 A 12/1989

* cited by examiner

*Primary Examiner* — Benjamin Kurtz
(74) *Attorney, Agent, or Firm* — Robert G. Lev

(57) ABSTRACT

A sediment collection device is used on individual beverage containers for fermented beverages such as beer. A three piece arrangement is fit together before installation on the beverage container, and contains a rotating valve arrangement on complementary, funnel-like structures. This arrangement facilitates a moisture-tight connection between the bottle and the collection device. This arrangement ensures that sediment will not re-enter the beverage bottle.

15 Claims, 4 Drawing Sheets

SEDIMENT COLLECTION DEVICE FOR HOME BREWING SYSTEM

PRIORITY INFORMATION

The present invention claims priority to Provisional Patent Application No. 60/965,982 filed on Aug. 23, 2007, and makes reference thereto in its entirety.

FIELD OF INVENTION

The present invention relates generally to the brewing of beer and other fermented beverages in a non-industrial environment, such as home brewing applications. In particular, the present invention is directed to a sediment collection system used on individual bottles of beer, or other fermented beverages.

BACKGROUND ART

Most of the advances in the processing of fermented beverages have occurred at the industrial level, directed to large scale operations and large containers of the product. These advances are for the most part inapplicable to home brewing endeavors due to substantially different scales of operation. Consequently, advances in the art/science of home brewing have not been as extensive as those applied to the industrial production of fermented beverages. As a result, efficient devices for the processes necessary for home brewing of fermented beverages are often not available or are substantially lacking in effectiveness.

The brewing of fermented beverages involves the preparation and fermentation of a sweet liquor. This liquor is normally fermented utilizing the biological activity of yeast on a batch of the liquor in a vessel. The first process is known as primary fermentation. This is a process that is well known and has been subjected to extensive refinement, especially in industrial-sized operations.

When carrying out the brewing of beer or similar liquors in a non-industrial (or home) environment, after the primary fermentation process is complete, the fermented liquor is decanted into bottles of various sizes and shapes. These are selected based upon what is convenient for the home-brewer, and are usually constituted by the bottles that will store and be used to serve the fermented liquor such as beer.

When brewing beer, the bottle of liquor is then charged with a measure of fermentable carbohydrate, and sealed. This begins a process of secondary fermentation which proceeds in the sealed bottle due to the remaining yeast (from the original fermentation) in the fermented liquor. The secondary fermentation is necessary to provide additional taste development and the characteristic carbonation of modern beer (as well as other liquors subject to this or similar processes). A major byproduct of this secondary fermentation is a quantity of yeast sediment. This is usually considered unacceptable by the consumers of modern beer, and must be eliminated before the beer can be properly enjoyed.

As a result of these conditions, there are a number of sediment collection devices used with beer (and other fermented beverages) bottles for collecting the undesired sediment (yeast or other materials). All apparently suffer from the same limitations. In particular, these devices are often very awkward to attach to standard bottles, and very often permit leakage in both directions. Many of these devices are arranged in a manner that inhibits the transfer of yeast from the bottle into the sediment collection device. As a result, the filtration or sediment collection process takes longer than desired. Very often, if the sediment cannot easily precipitate out of the bottle into a sediment collector, the clarity of the beverage is compromised. Consequently, ease of migration is crucial in home brewing, but is usually not found with conventional art devices.

Those few conventional devices that facilitate rapid sediment migration are often relatively complicated. This means that operation can be awkward, defeating some of the pleasure that a hobbyist involved in home brewing would derive from the process. Also, relatively complex sediment collection systems are more expensive, and have more parts. This is crucial in that complicated mechanical arrangements can be very expensive, limiting the number of bottles that can be involved. This limitation also decreases the pleasure that the hobbyist will take in home brewing.

A more crucial factor is that complex sediment collection devices are often very difficult to clean properly, so that the risk of infection is substantially increased. This adds a level of danger that, while exciting, is not desired by even the most adventurous hobbyist.

Accordingly, the conventional art of sediment collectors for home brewing systems admits to substantial improvement to overcome existing deficiencies. An improved sediment collection device would be more simple, safe and effective, while being easy for use in a home brewing process.

SUMMARY OF INVENTION

It is a first object of the present invention to overcome the drawbacks of conventional art sediment collection devices used in home brewing processes.

It is another object of the present invention to provide a sediment collecting device that is easily connected to individual bottles of various configurations.

It is a further object of the present invention to provide a sediment collecting device that is of simple construction, facilitating easy cleaning.

It is an additional object of the present invention to provide a sediment collecting device that minimizes risk of infection due to residue on the device.

It is yet another object of the present invention to provide a sediment collecting device for individual beverage bottles wherein the collection device facilitates rapid migration of sediment out of the beverage bottle.

It is yet a further object of the present invention to provide a sediment collection device for individual beverage bottles wherein the reintroduction of sediment back into the beverage bottle is minimized.

It is again an additional object of the present invention to provide a sediment collecting device for individual beverage bottles wherein leakage is prevented so that the risk of beverage oxidation is minimized.

It is still another object of the present invention to provide a sediment collecting device for individual beverage bottles wherein the collection device can be simply and easily operated.

It is yet a further object of the present invention to provide a sediment collection device for individual beverage bottles wherein operation of the collection device does not cause suspension of settled yeast back into the beverage.

It is again an additional object of the present invention to provide a sediment collection device for individual beverage bottles wherein leakage is minimized.

It is still another object of the present invention to provide a sediment collection device for individual beverage bottles wherein the collection device is easily attached to a wide variety of different bottle sizes and shapes.

It is yet a further object of the present invention to provide a sediment collection device for individual beverage bottles in which the process of attaching the collection device to bottles is simplified.

These and other goals and objects of the present invention are achieved by a sediment collection device arranged in three parts that are configured to be sealed together prior to attaching to an external beverage container. The collection device includes a first part configured to connect to said beverage container, and has a spout with a side aperture. The second part includes complementary cover for the spout. The complementary cover is arranged to seal the spout, and includes an aperture which permits flow when aligned with the aperture on the spout. Interfacing between the first part and the second part facilitates rotation, whereby the two apertures can be aligned. A third part is constituted by a receptacle, and is arranged to be sealed to the first part, locking the second part with the receptacle and between the first and third parts in a moisture tight arrangement.

DRAWINGS

DETAILED DESCRIPTION OF THE PREFERRED EMBODIMENTS

Figure 1:
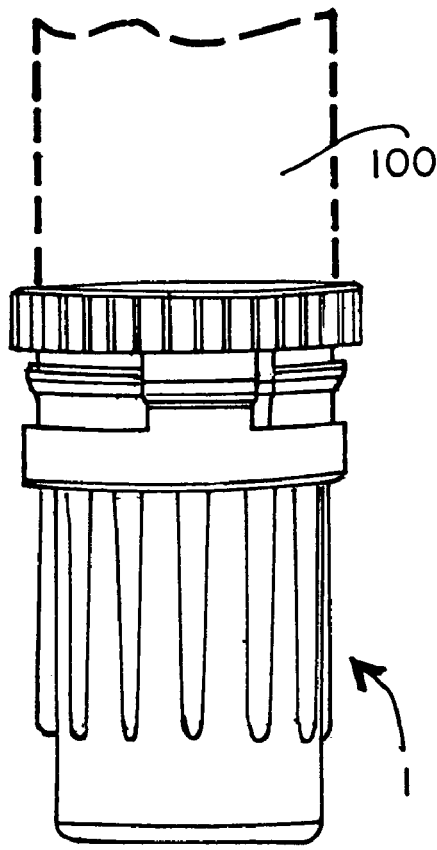
FIG. 1 is a side view of the inventive sediment collection device in a fully-assembled configuration.

The sediment collector 1 of the present invention, is depicted in FIGS. 1-4. Sediment collector 1 is composed of three components, the lid 2, the lid valve 3, and the receptacle 4. There is also a separate O-ring 5 (for sealing) between the receptacle 4 and the lid 2. All three components are configured to be connected together in a tightly-sealed configuration as depicted in FIG. 1. This assembly is meant to take place before attaching the sediment collector 1 to beverage container 100.

Figure 5:
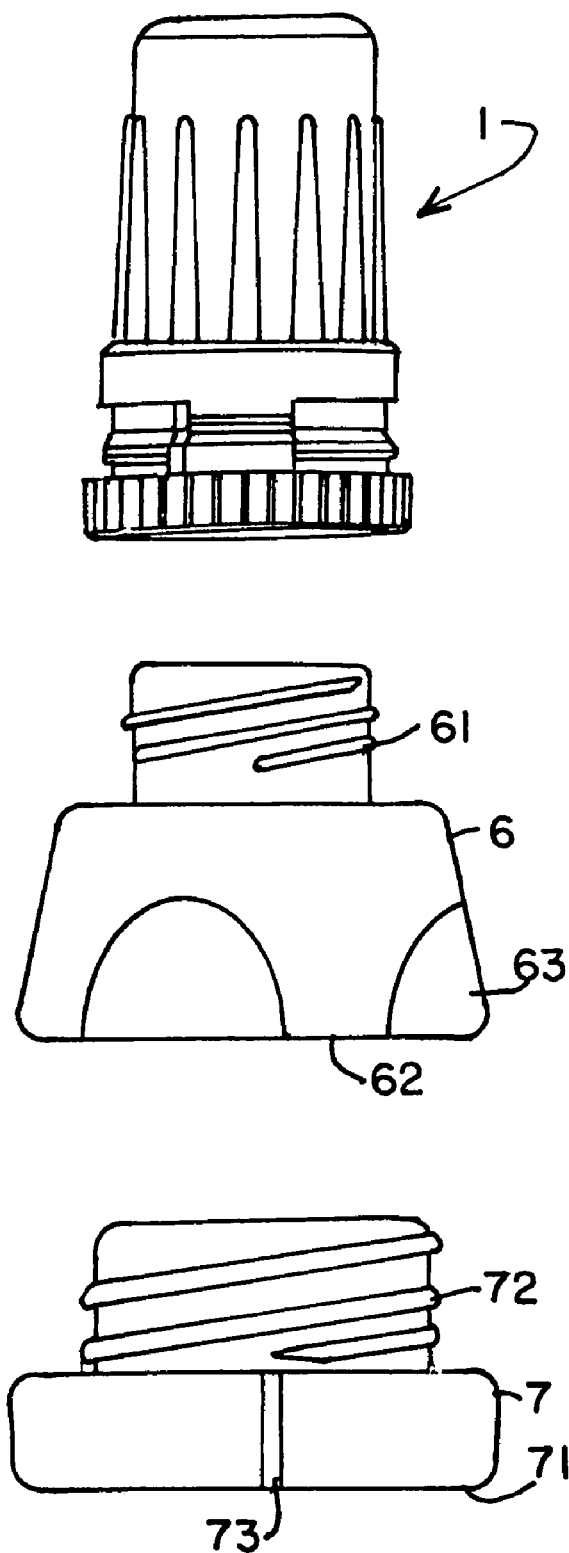
FIG. 5 is a side view of the sediment collection device separated from one embodiment of the bottle attachment device.

The present invention is constituted by the sediment collection device 1. An auxiliary clamping device (parts 6 and 7) is depicted in FIG. 5, as an additional preferred embodiment of the present invention. A manufactured embodiment of the present invention is depicted by copies of photographs and sketches included in Appendix I. While not necessary for an understanding of the present invention, Appendix I is provided for the convenience of the Examiner to better visualize one manufactured version of the invention covered by the claims of the present application.

It is crucial that the receptacle 4 be separable from the lid 2, and lid valve 3. The separability is necessary in order to collect and remove the yeast sediment without losing appreciable amounts of liquid from beverage container or bottle 100 (depicted in FIG. 1). Further, the overall design has to be configured so that the yeast collected in receptacle 4 has little or no chance of recombining with the liquid in bottle 100. This capability is due to the particular design of the present invention described infra, and is one of the major benefits of the present invention.

Another major advantage of the present invention is that the sediment collection device 1 can be used as a "stand-alone" device. This means that the inventive device can be used without the need for additional equipment. The sediment collecting device 1 is meant to be used on individual bottles and needs only to be inverted for use. The only modification to the bottle or other container is that the normal closure device is removed, and replaced by the sediment collector 1 of the present invention.

Because the present invention is not designed to support a bottle, an external bottle holder, that will keep the bottle in the inverted position, is necessary. Fortunately, such devices are very common in the home brewing field so that no additional elaboration is required for purposes of understanding the present invention. Any arrangement for safely inverting a beverage bottle can be used within the concept of the present invention. The size and shape of the beverage bottle constitute the most likely determinants for the inverting arrangement, and so are beyond the scope of the present disclosure.

Preferably, the receptacle 4 is of a clear material. While this is not crucial to the operation of the present invention, it is very convenient since the amount of sediment collected can be easily viewed so that the brewer can determine when the appropriate amount of sediment has been removed from container 100, and the process is complete.

The lid 2 has a first end that interfaces with the beverage container, such as bottle 100. This end of the lid 2 is arranged to have an inner threaded opening 28 or other configuration designed to interface with the outer shape and threading (if present) of the bottle 100. The lid also has an outer ridge 26 with a stop 24 used to secure the receptacle 4 to the lid 2 and to locate the position of the receptacle 4 so that assembly of the device and sealing operations can be easily conducted.

Figure 3:
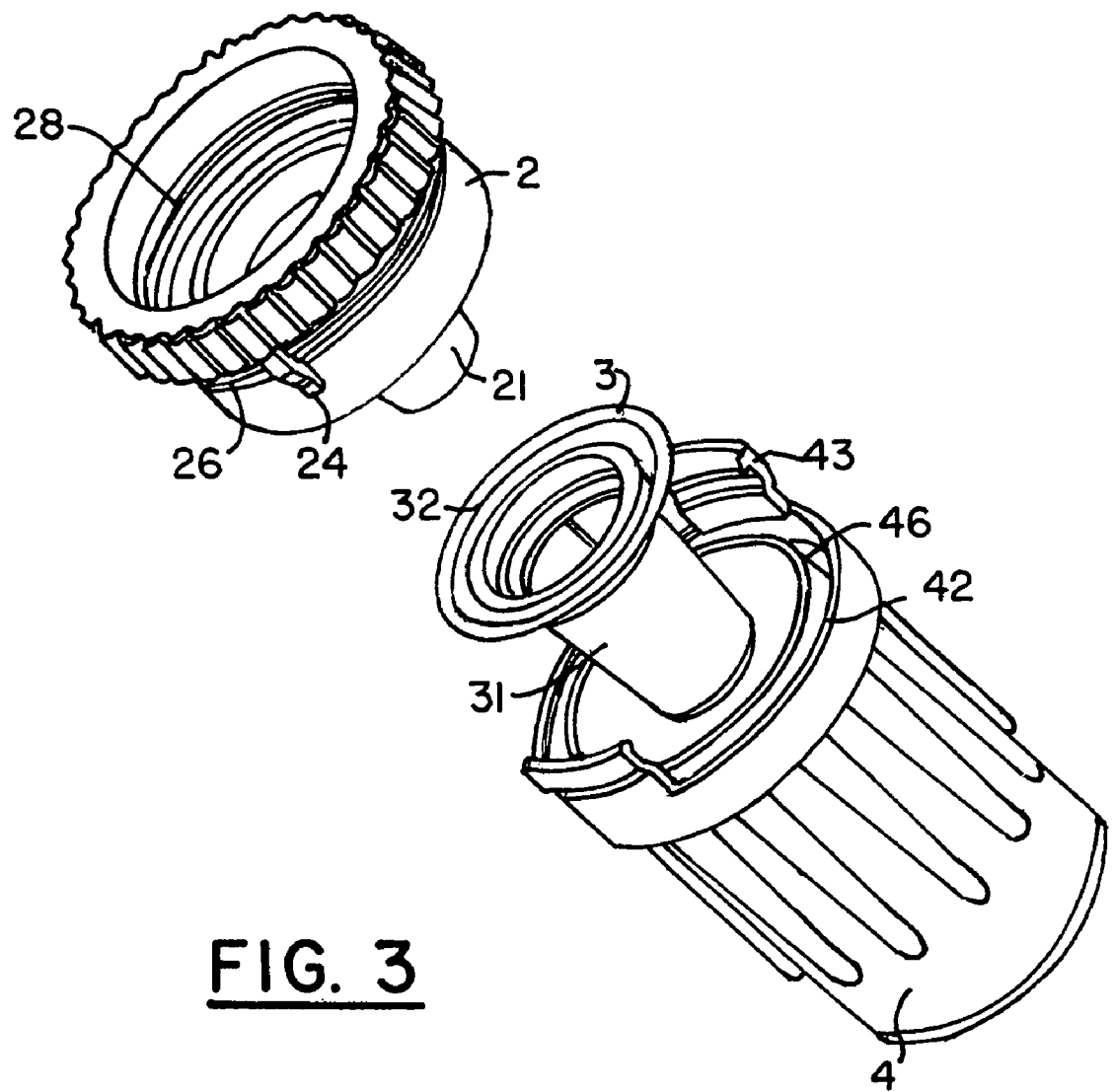
FIG. 3 is a perspective view depicting the separate components of FIGS. 1 and 2.

While the opening 28 is used in the FIG. 3 embodiment, the present invention is not limited thereto. Rather, this part of lid 2 can be configured for virtually any type of container. Also, rather than an inner threaded arrangement, a clamping system with seals can be used within the concept of the present invention. The crucial aspect of this part of the invention is that an easily-removable, liquid-tight seal be maintained between collection device 1 and bottle 100.

Figure 2:
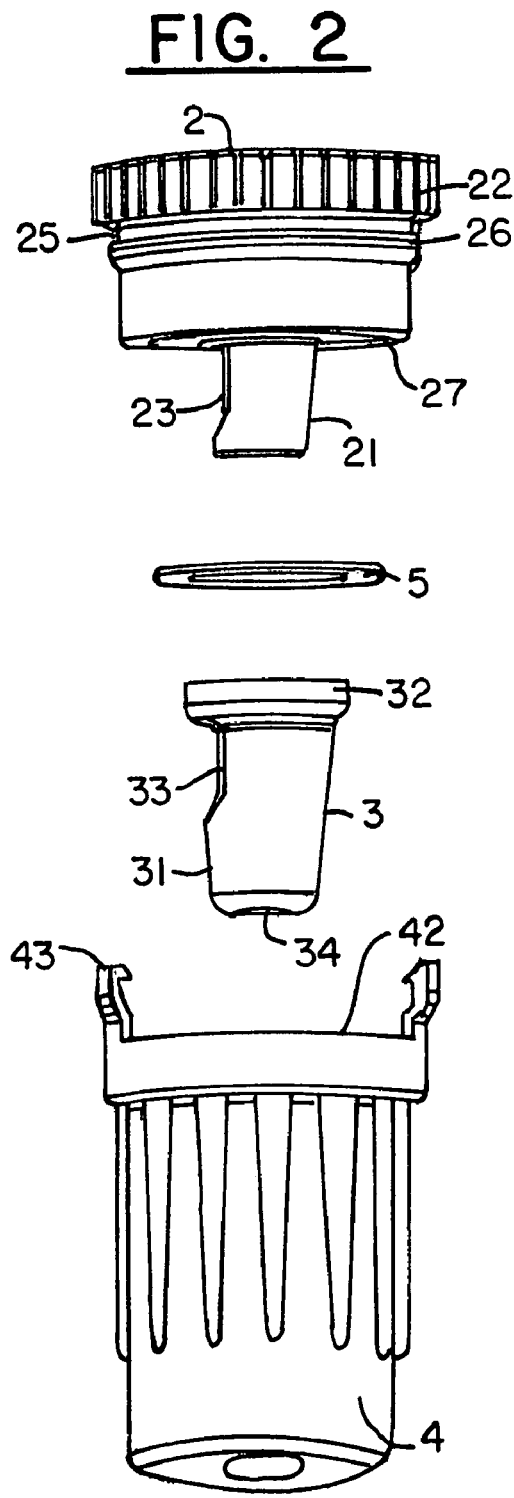
FIG. 2 is a perspective side view depicting the separate components assembled in FIG. 1.
Figure 4:
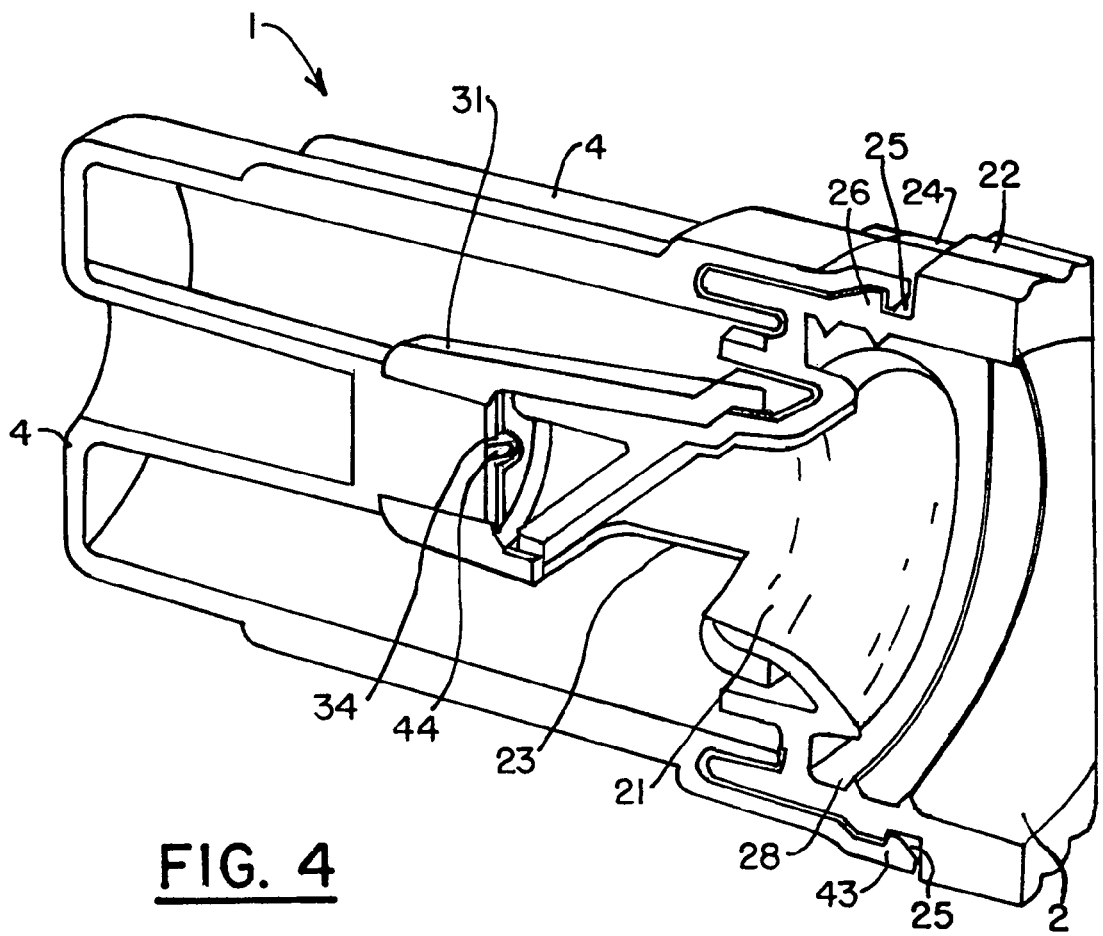
FIG. 4 is a side sectional view in perspective of the fully assembled inventive device of FIG. 1.

The lid 2 has an extending central spout or funnel 21 that includes a side opening or aperture 23. Preferably, the central spout or funnel 21 is preferably in the form of a truncated cone as depicted in FIGS. 2 and 4. However, other shapes will occur in variations of the present invention. The lid 2 also has an upper perimeter configured with a circular recess 27 that seats a separate O-ring 5 to create a seal between lid 2 and receptacle 4. The lid 2 also has a lateral grove 25 for seating a leading edge 43 of the receptacle 4 when all three elements are fit together as depicted in FIGS. 1 and 4. When this occurs, the configuration 1 is sealed to prevent the migration of liquid other than as desired through the apertures 23, 33 (if aligned with each other).

The lid valve 3 is also in the shape of a truncated cone, and sized so that it fits closely over the central spout or funnel 21 of the lid 2. The apertures (23, 33, respectively) in both the lid 2 and the lid valve 3 are aligned so that when the lid valve 3 is twisted the apertures 23, 33 can be shifted entirely in or out of alignment. When the apertures are shifted entirely out of alignment an effective seal is made between the lid 2 and the lid valve 3. This is a crucial aspect for the operation of the inventive sediment collecting device 1. Further, it is crucial that both the lid 2 and the lid valve 3 have complementary, close-fitted shapes to prevent migration of liquid except when such migration is desired (apertures 23, 33 in alignment).

Many shapes are suitable for use in the present invention. However, the funnel shapes or truncated cones appear preferable.

Control of liquid migration when the entire device 1 is assembled is achieved by a number of locking devices to hold all three pieces together. The first such device is a keyway 34 at the apex of the lid valve 3 for receiving a key 44 from the receptacle 4. Keyway 34 is preferably sealed at its bottom and extends downward into the funnel 31 of lid valve 3. Key 44 extends from a funnel-like or cone-like structure 45 formed within receptacle 4. While the funnel-like structure is shown in FIG. 4, other structures can be used to support key 44 for the connecting of receptacle 4 to lid valve 3. It should be noted that while receptacle 4 and lid valve 3 are locked together so that they can not rotate separately, lid valve 3 and receptacle 4 can rotate together with respect to lid 2. This is important for the operation of the present invention as will be described infra.

The receptacle 4 has two leading clips 43 that are designed to fit over an outer rim 26 of the lid 2 to secure all three parts together. Circular ridge 46 is designed to fit adjacent to O-ring 5 located in the upper recess 27 of the lid 2. Because of O-ring 5, circular ridge 46 of receptacle 4 is able to affect a seal of connection with lid 2. An inner receiving surface 28 is also be provided on lid 2 to form a seal with the lower surface of ridge 32 to render the connection between lid 2 and lid value 3 to be liquid-tight.

The drawings depict two clips 43 to hold receptacle 4 to lid 2. These are helpful for holding the entire 3-piece configuration 1 together as one unit in a liquid-tight manner. However, they are also important in the sediment collecting process as will be described infra. Other arrangements for holding receptacle 4 to lid 2 can also be used within the concept of the present invention.

The present invention is not involved in the primary fermentation process, described supra. Rather, the present invention is devoted to that part of the brewing process that employs secondary fermentation. The present invention 1 is installed on bottles or other containers when all necessary preparation for secondary fermentation has taken place, and prior to the start of secondary fermentation the apertures 23, 33 are rotated into alignment.

Once the secondary fermentation is largely complete (usually determined by elapsed time), apertures 23, 33 are rotated in alignment the entire device 1, including the sediment in receptacle 4, can be removed for disposal of the sediment, and a normal closure can immediately be fitted to the container, or the beverage immediately consumed. Alternatively, the device 1 can be left in position and later removed at the convenience of the home brewer.

Prior to secondary fermentation, the parts of the present invention are sealed together. Then, the assembly 1 is installed by fitting the lower part of the lid 2 over the bottle 100. This installation can be done in a wide variety of different ways within the concept of the present invention. For example, a screw type connector 28 arranged on the interior of the lid, as depicted in the FIG. 3, may be appropriate for many types of bottles. However, for other types of bottles a clamp arrangement (as depicted in FIG. 5 and Appendix I) would be preferred. Further, any other appropriate connecting device that effects a seal between the lid 2 and the beverage container 100 will fall within the concept of the present invention.

Before the lid 2 of the inventive sediment collection device 1 is fitted to the bottle 100, the other components (receptacle 4 and lid valve 3) have been assembled. Such assembly of the present invention is quick and simple. The O-ring 5 is pressed into position on the lid 2. Then the lid valve 3 is pressed over the cylindrical cone 21 of the lid 2. Finally, the receptacle 4 is placed over both, and the two leading clips 43 of the receptacle 4 interface with the lip 26 of the lid 2 to hold the entire device 1 together.

To operate device 1 for sediment collection, receptacle 4 and lid valves 3 are rotated with respect to the lid 2. As a result, the lid valve 3 rotates so that the two apertures 23, 33 are in alignment with each other. This is the only position in which liquid from the container 100 can migrate into the receptacle 4. This operation is easily achieved because of outer ridge stops 24 on the lid 2 which confines the rotation between a completely sealed position and a completely opened position.

The bottle 100 is then stored in an inverted position in an appropriate rack or other holding device (not shown). Any yeast sediment which has resulted from the secondary fermentation migrates to the now-inverted top of the bottle 100 and settles there. When the receptacle 4 and lid valves are rotated so as to allow fluid to flow into the receptacle 4, the sediment begins to migrate to receptacle 4. Since the sediment is heavier than the fluid, the sediment will settle to the bottom of the receptacle 4 under the influence of gravity. Because of the funnel or truncated cone shape (31, 21) of the valve structures, the sediment is allowed to move easily from the bottle 100 into the receptacle 4.

The apertures 33, 23 are located near the base of their respective funnel-like structures 31, 21 respectively. The funnel-like shapes facilitate the operation of the apertures, maximizing the easy flow of sediment through the apertures 33, 23 and into the receptacle 4. The easy flow of sediment because of this arrangement helps to prevent the resuspension of that sediment back into the liquid.

When all the yeast sediment has settled, the receptacle 4 can be twisted (approximately 180 degrees) to move the lid valve 3 position such that the two apertures (21, 31) are out of alignment and the connection is sealed. Thus, the yeast sediment is isolated in the receptacle 4, and re-suspension of the sediment is minimized. Following this operation, the bottle is returned to its normal, upright position. If the inventive sediment collection device 1 is removed, the bottle can then be resealed with a normal closure device. Further, the collection device 1 (in its fully assembled configuration) can be used as a bottle seal to minimize oxidation. The beverage is now considered relatively clarified and ready for use. The present invention allows beverage consistency to be maintained from bottle to bottle.

The three main pieces of the inventive sediment collector 1, along with O-ring 5 can be easily disassembled and cleaned. The simplicity and limited number of parts of the present invention 1 facilitates easy operation as well as easy cleaning. Thorough cleaning of the parts is crucial in order to maintain sanitary equipment for health reasons, and to avoid compromising the taste of the beverage involved. The present invention simplifies the necessary cleaning process. As a result, the home brewing process becomes far more pleasurable, without compromising the cleaning process and creating health dangers.

Because all three parts of the sediment collector are assembled before placing it on a beverage container 100, the process of secondary fermentation and sediment collection are much simplified. Also, because of the seals between all three parts, which can be secured in a moisture-tight manner before placement on the beverage container, greater control is provided for the home brewer. The quality of the final product is improved by the fact that oxidation of liquid can be controlled due to the tight seals, and the ease of handling the collection device 1. The simplicity and low cost of the sediment collection device 1 makes it feasible to use as individual bottle closures until the beverage of individual bottles is consumed. The increased control of the process, combined with the lessened effort necessary makes the present invention a very desirable product for the home brewer.

It is well-known that a number of different container sizes and configurations are used in the home brewing process. Beverage containers or bottles change from brewer to brewer, and from beverage to beverage, and from region to region, based upon the containers that might be readily available. Consequently, a home brewer may attempt to use beverage containers that do not have the standard threaded neck which would normally interface with threading 28 (of FIG. 3). Accordingly, other arrangements must be made.

FIG. 5 depicts an alternative connection arrangement to that of FIG. 3. This connection arrangement is constituted by two pieces, arranged to easily interface and connect to sediment collection device 1 and to a beverage container. The first piece is an interface or adaptor 6. This piece is constituted by exterior threading 61 which easily interfaces with interior threading 28 of sediment collection device 1. Also, (not shown) is interior threading 62, which is sized and configured to fit to exterior threading 72 of clamp piece 7. Adaptor 6 also has indentations 63, sized for easy manipulation by fingers.

Clamp piece 7 preferably has a split base 71. This base is discontinuous, having a split or open section 73 to better fit over the necks of beverage containers. The split 73 may be only in the base 71, or may extend through the threaded section 72. Likewise, the base section 71 may also contain a hinged portion (not shown) opposite split 73 to facilitate a wider opening to accommodate more bottle sizes.

Sealing of the clamp piece 7 is accomplished through the action of adaptor 6, which screws over threaded portion 72, thereby pulling the entirety of the clamp piece 7 together to form a tight fit around the neck of the container (not shown).

In operation, the clamp section 7 fits over the neck of the bottle or beverage container and wedges underneath the bottle opening ridge or lip that normally is formed as a part of the manufacturing process for such containers. This helps to secure the clamp section 7 in a moisture-tight configuration once adaptor or interface 6 is screwed onto the threaded portion 72. This operation decreases the overall diameter of the clamp section 7 through the compression effected by the screwing operation, adaptor 6. As a result, the configuration of FIG. 5 can be used in a wide variety of different bottle size and neck configurations. Further, the split 73 can be configured in a wide variety of manners, including the use of a hinge on the opposite side of the split 73. Also, the clamp section 7 can be formed in two separate parts to be fit together around the neck of a container and then sealed thereto when adaptor 6 is screwed onto the threaded section 72.

The adaptor or interface 6 can be formed in a wide variety of sizes, so long as its threaded portion 61 is of the appropriate size to fit with sediment collection device 1. This means that a very wide array of bottle types and sizes can be accommodated simply by changing the inner threading 62 of adaptor 6, so that the correct size of clamp 7 can be accommodated. Because of the connection arrangement depicted in FIG. 5 (and further elaborated upon in the Appendix), the home brewer is not confined to standard bottles when using the present invention.

While a number of the preferred embodiments of the present invention have been described by way of example, the present invention is not limited thereto. Rather, the present invention should be construed to include any and all modifications, variations, mutations, adaptations, derivations, and embodiments that would occur to one skilled in this art using the teachings of the present invention. Accordingly, the present invention should be interpreted as being limited only by the following claims.

I claim:

1. A sediment collection device configured for individual beverage containers, said sediment collection device comprising:
    (a) a first part configured to be connected to external beverage containers, said first part having a spout-like structure and a first aperture in said spout-like structure;
    (b) a second part configured to sealably interface with said first part, said second part having a spout-like cover with a second aperture configured to fit over and seal said spout-like structure of said first part so that said first and second apertures can be rotated into alignment; and,
    (c) a third part comprising a sediment collection receptacle, a connector to removeably and sealably hold said third part to said first part, and a locking device to removeably hold said third part to said second part, in a manner to facilitate rotation of said second and third parts together with respect to said first part, said locking device comprising a key in said third part extending toward said second part, and a receiver in a top surface of said second part configured to receive and hold said key when said third part is moved axially towards said second part.

2. The sediment collection device in claim, 1 wherein said first, second, and third parts are configured to be sealably connected together to form a structure capable of substantially resisting moisture migration, said first, second and third parts being configured to be connected together before attachment to said beverage container.

3. The sediment collection device of claim 1, wherein said sediment collection receptacle is made of a material that is at least light translucent permitting visual inspection of sediment collected in said sediment collection receptacle.

4. The sediment collection device of claim 2, wherein said structure and said spout-like cover are formed in a shape of a truncated cone.

5. The sediment collection device of claim 4, wherein said first aperture is formed on an upper side wall of said spout-like structure, and said second aperture is formed on an upper side wall of said cover.

6. The sediment collection device of claim 1, wherein said first part comprises a first annular indentation for receiving at least a portion of said connector from said third part.

7. The sediment collection device of claim 6, further comprising an O-ring arranged to seal a portion of said third part to said first part.

8. The sediment collection device of claim 7, wherein said first part further comprises a second annular indentation configured to receive said O-ring.

9. The sediment collection device of claim 2, wherein said first part further comprises internal threading sized to connect to a beverage bottle.

10. The sediment collection device of claim 6, wherein said connector of said third part interfaces with said first annular indention of said first part to hold said second part to said first part in a sealable manner.

11. The sediment collection device of claim 2, further comprising an adapter assembly configured to connect to said first part and to a variety of external beverage containers having multiple sizes and configurations.

12. The sediment collection device of claim 11, wherein adapter assembly comprises:
   (d) a clamping piece to attach to external beverage containers: and,
   (e) a locking section for holding said clamping section, and attaching to said first part.

13. The sediment collection device of claim 12, wherein said locking section comprises a split base and an upper threaded section.

14. The sediment collection device of claim 13, wherein said upper threaded section of said clamping section is an external threaded section configured to connect to said first part.

15. The sediment collection device of claim 13, wherein tightening of said locking section on said upper threaded section of said clamping section holds said clamping section to said external beverage container.

* * * * *